United States Patent [19]

Bachmann

[11] Patent Number: 4,932,437
[45] Date of Patent: Jun. 12, 1990

[54] LOUVER DAMPERS FOR USE IN GAS TURBINES EXHAUST SYSTEMS AND HAVING BLADES PROTECTED AGAINST BECOMING WARPED

[75] Inventor: Lothar Bachmann, Auburn, Me.

[73] Assignee: Bachmann Corporate Services, Inc., Lewiston, Me.

[21] Appl. No.: 309,257

[22] Filed: Feb. 13, 1989

[51] Int. Cl.⁵ ............................................. F16K 1/226
[52] U.S. Cl. ................................................. 137/601
[58] Field of Search .......................... 137/601; 251/305

[56] References Cited

U.S. PATENT DOCUMENTS

| 2,328,736 | 9/1943 | Mock | 251/305 X |
| 4,325,411 | 4/1982 | Squirrel | 137/601 X |
| 4,335,738 | 6/1982 | Nassir | 251/305 X |
| 4,821,507 | 4/1989 | Bachmann et al. | 60/39.182 |
| 4,823,836 | 4/1989 | Bachmann et al. | 137/601 |

FOREIGN PATENT DOCUMENTS

| 1500005 | 5/1969 | Fed. Rep. of Germany | 251/305 |
| 48111 | 11/1981 | U.S.S.R. | 251/305 |

*Primary Examiner*—Stephen M. Hepperle

[57] ABSTRACT

Louver dampers for use in the exhaust system of gas turbines have flat blades each of which is provided with a lengthwise reinforcement spaced from the major portion of its face which is upstream when the damper is closed and has sides welded thereto adjacent the side margins thereof. Each side of each reinforcement has ports which ensure contact of hot gases with the portions of the blade underlying the reinforcement so that the entire surface of each blade and its reinforcement are uniformly heated preventing blade distortion that would prevent the operation of the damper and destroy the effectiveness of seals in case the damper is equipped therewith.

3 Claims, 3 Drawing Sheets

LOUVER DAMPERS FOR USE IN GAS TURBINES EXHAUST SYSTEMS AND HAVING BLADES PROTECTED AGAINST BECOMING WARPED

BACKGROUND OF THE INVENTION

When a gas turbine is started, the volume, temperature and velocity of its exhaust gases very quickly reach their maximums. The exhaust systems of gas turbines are employed to provide the heat required for the operation of heat recovery steam boilers and such systems typically have a bypass into which the hot gas stream is diverted when, for one example, the cogenerating system is to be placed temporarily out of service.

Means are provided to control the flow to the steam boiler and to divert the exhaust stream into the bypass and such may be a hinged diverter blade operable to shift the flow from either system to the other, see Ser. No. 055,594, filed May 29, 1987, now U.S. Pat. No. 4,821,507, and Ser. No. 200,504 filed May 31, 1988 now U.S. Pat. No. 4,823,836, or one or more louver dampers or a combination of louver and guillotine dampers may be positioned in the bypass and one or more louver dampers or a combination of louver and guillotine dampers may be incorporated in the exhaust system between the bypass and the steam boiler.

Because of the sudden build up of the temperature in gas turbine exhaust systems, it is necessary for louver dampers to be able to accommodate thermal expansion forces. In Ser. No. 055,594, a diverter blade is disclosed having that capacity and in Ser. No. 200,504 effective leaf spring seals are provided which are installed in a manner accommodative of thermal expansion forces in conjunction both with diverter blades and louver dampers.

In the manufacture of louver dampers, the weight of the louver blades is held down by utilizing relatively thin metal stock and by a construction providing a suitably reinforced blade and ported to enable interior surfaces and surfaces upstream when the damper is closed to be evenly heated in order to avoid blade distortions.

THE PRESENT INVENTION

The general objective of the present invention is to provide louver dampers the blades of which are flat and reinforced on their faces which are exposed upstream when the dampers are closed in a manner enabling the upstream faces to be uniformly heated as if the reinforcements were not present.

In accordance with the invention, this objective is attained with a reinforcement for the upstream face of each blade extending lengthwise thereof and overlying the major portion of the blade. The reinforcement includes a central portion spaced from the reinforced face and side portions welded to the blade adjacent its side edges. Typically, the ends of each reinforcement are closed by gussets.

Both side portions of each blade reinforcement are provided with a lengthwise series of holes spaced and arranged so that, when the blades of the louver damper are positioned to block the entry of the hot exhaust gases into a downstream section of the exhaust system, the hot gases enter, circulate through the reinforcement with turbulence and exit through ports so that the portion of the blade underlying each reinforcement and portions of the blade marginally thereof are so uniformly heated that blade distortion does not occur even with the sudden high temperature rise that attends each start up of the associated turbine or the thermal shock which occurs each time the damper is closed.

BRIEF DESCRIPTION OF THE DRAWINGS

The accompanying drawings illustrate a preferred embodiment of a louver damper in accordance with the invention

THE PREFERRED EMBODIMENT OF THE INVENTION

Figure 1:
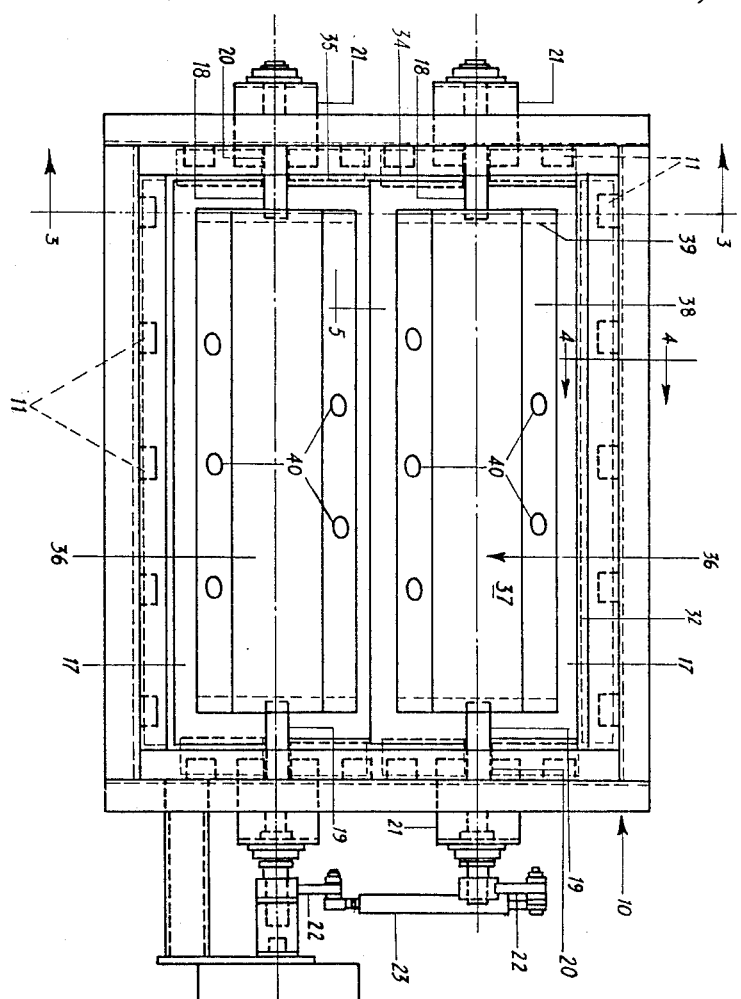
FIG. 1 is a view of the upstream side of the damper with the blades in their closed operative position.
Figure 2:
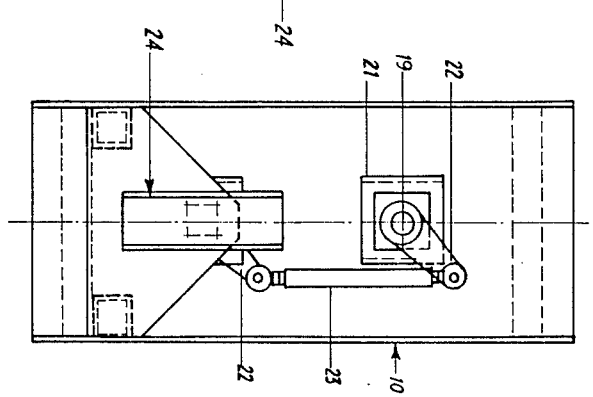
FIG. 2 is an end view of the damper.
Figure 3:
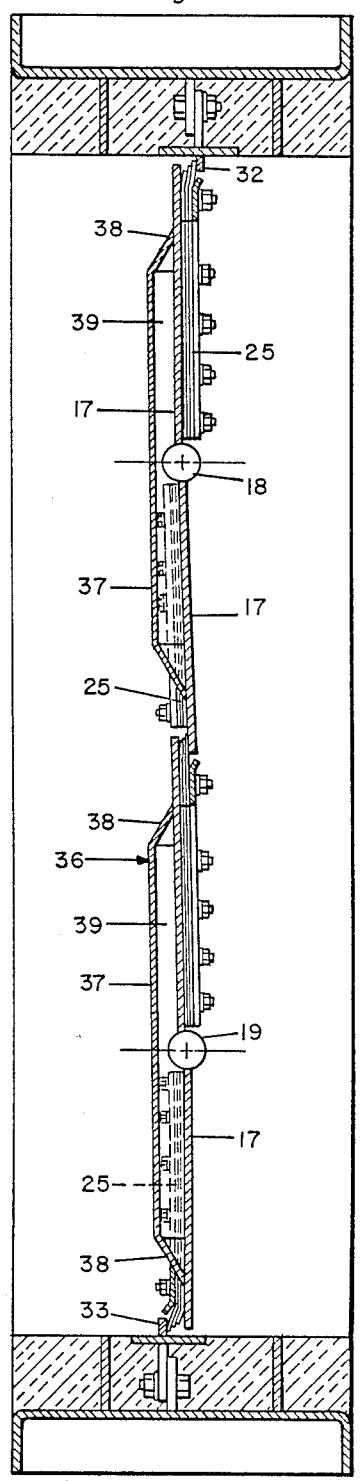
FIG. 3 is a section on an increase in scale taken approximately along the indicated line 3—3 of FIG. 1.
Figure 4:
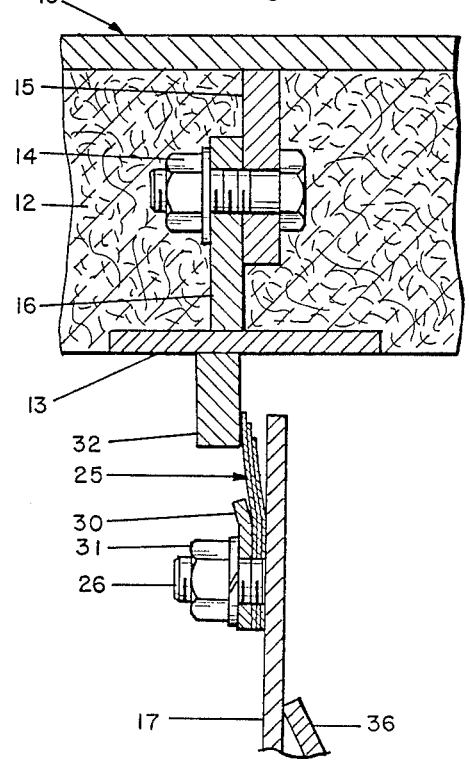
FIG. 4 is a fragmentary section, on a further increase in scale, taken approximately along the indicated line 4—4 of FIG. 1.

The louver damper illustrated by the drawings includes a frame, generally indicated at 10 which, like adjacent duct sections is rectangular and formed of appropriate lengths of outwardly opening channel stock having on its inner surfaces anchors 11, see FIG. 1, for castable refractory 12 rendering the frame 10 a cold frame. The frame 10 differs from those of adjacent duct sections in that, see FIG. 4, its top, bottom and side walls have corresponding walls of an inner frame 13 joined thereto through the refractory 12 by a series of nut and bolt connections, generally indicated at 14 interconnecting a series of mounts 15 fixed on the inner surfaces of the cold frame 10 and supports 16 on the proximate surfaces of the inner frame 13. As shown in FIG. 11 the holes for the bolts in the supports 16 are oversized to enable thermal expansion forces to be accommodated.

The louver damper has two flat rectangular blades 17 of substantial length. Each blade 17 has aligned shafts 18 and 19 centrally of its ends which extend through sleeves 20 in the refractory 12 and are welded to the frames 10 and 13. The shafts of the two blades are in the same vertical plane. The shafts are supported by bearing assemblies 21 on the outside of the frame 10 which also seal the sleeves 20. The shafts 18 are stub shafts while the shafts 19 have arms interconnected by a link 23. One of the shafts 19 is coupled to an actuator 24 which may be of any type operable to turn the two blades 17 together and to the same extent between closed and open positions.

The blades 17 are so dimensioned that when mounted in the frame 13, there is a working clearance between their ends and their opposite side edges with respect to the corresponding walls of the frame 13. The blades are also so dimensioned that when in their operative position in which they lie substantially in the previously referred to plane, there is a working clearance between their proximate side edges.

In order to prevent hot gas from flowing through the working clearances, leaf spring seal assemblies, generally indicated at 25 are secured to the margins of the blades. The assemblies are shown as in accordance with the copending application of Lothar Bachmann and William F. Koch, Ser. No. 200,504, filed May 31, 1988.

Figure 5:
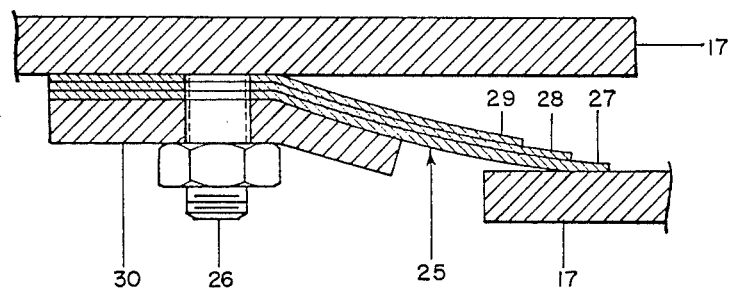
FIG. 5 is a fragmentary view illustrating The leaf spring seals at a corner of one of the louver blades.
Figure 6:
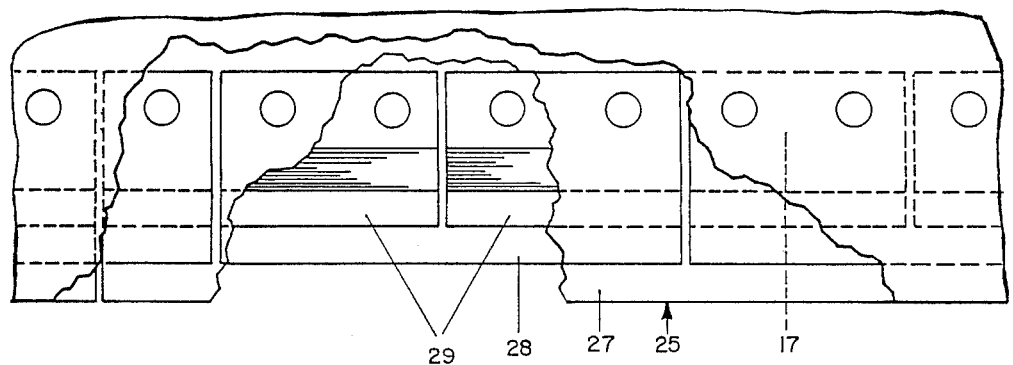
FIG. 6 is a fragmentary, top plan view of the leaf spring seal assemblies and lower damper blades.

In FIG. 5 the assemblies 25 are shown as connected to one of the proximate side edges of the blades 17 in sealing engagement with the other, of the proximate side edge. The side edge of the blade provided with the leaf spring seal assembly has a lengthwise series of studs 26 extending through oversized holes in one end of each of the leaf springs 27, 28 and 29 and through an oversized hole in the clamping bar 30. Nuts 31 threaded on the studs 26 lock the assembly in place. The leaf springs 28 and 29 are progressively narrower than the leaf spring 27. The other or free ends of the leaf springs are bent to the same extent along a common line and are held tensioned by the free end of the clamping bar 30 which is inclined in the same direction but to a lesser extent than the leaf springs. While the oversized holes through which the studs extend enable thermal expansion forces to be accommodated, in practice, the sealing means at the blade margins is effected, see FIG. 6, by a lengthwise series of assemblies 25 positioned with a gap between the clamping bars of two assemblies with expansion gaps between corresponding leaf springs of the assemblies with the leaf springs so disposed that gas flow through the gap between any two corresponding leaf springs is blocked by at least one other leaf spring.

In order for the leaf spring seals to be effective when the blades are in their closed position, the inner surfaces of the frame 13 are provided with seats of which the U-shaped seat 32 extend along the top side of the frame 13 downwardly along the sides thereof with a working clearance between their ends and the shafts of the upper blade 17 and a like seat 33 extends along the bottom side of the frame 13 with a working clearance between its ends and the shafts of the lower blade 17. The seats 32 and 33 are identical except that they are on opposite sides of the vertical plane inclusive of the axes of the shafts 18 and 19. In the embodiment of the invention illustrated by the drawings, the blades turn from their operative positions in the direction of the arrows necessitating such an offset of the seats 32 and 33. Leaf spring seal assemblies 25 extend along the margins of the blades 17 for engagement with the appropriate one of the seats 31 and 32 and to permit the blades to turn into and out of their inoperative, open positions.

The frame 13 is also provided with seats 34 and 35 for leaf spring seal assemblies 25 mounted on the proximate end margins of the blades 17. The seats 34 and 35 are located on opposite sides of the vertical plane inclusive of the shaft axes for engagement by the appropriate seal assembly when the blades are in their operative position.

Each blade has a reinforcement generally indicated at 36 on its face which is upstream when the damper is closed. Each reinforcement 36 is shown as welded assembly having a flat central section 37, flat side sections 38 inclined towards and welded to the blade close to the opposite margins thereof and spacing the central section from the underlying blade area and end gussets 39. Such an assembly, while necessary to avoid the use of thicker blades, presents the problem that it shields the major portion of its blade. To prevent warpage when the blades are subjected to the sudden blast of hot gas when the turbine is started, each side section is provided with a series of holes 40 with the holes in one side section 38 offset with respect to those in the other side section. With this construction, the hot exhaust gas not only impinges against portions of each blade surrounding its reinforcement but also flows through each reinforcement with turbulence ensuring the heating of all surfaces of the reinforcement and underlying portion of the blade in a manner preventing its becoming distorted and preventing operation of the damper. From the foregoing, it will be appreciated that effective sealing of clearances between the blades would be destroyed by such distortions.

I claim:

1. A louver damper to be incorporated in the exhaust system of a gas turbine, said damper including framework having a rectangular flow path opening therethrough, flat rectangular blades, two shafts for each blade and having first and second ends, the first ends welded to the opposite ends of the blades in alignment with the lengthwise center line thereof, the blades within the flow path one above the other, the second shaft ends rotatably supported by the framework with the axes of the blades parallel and in the same vertical plane, said blades having a working clearance with respect to the framework and to each other, means connected to the second ends of the shafts and operable to turn said blades together in the same direction and to the same extent between closed positions in which the blades are substantialy normal to said plane, and a reinforcement for each blade welded to the face thereof which is upstream in the closed position thereof, each reinforcement including a rectangular central portion spaced from said face and side portions welded to said face adjacent the margins thereof, each of said side portions having a plurality of holes spaced lengthwise thereof with the series of holes of one side portion offset with respect to the series of holes on the other side portion whereby hot exhaust gases circulate through the reinforcement with turbulence such that the entire upstream face is simultaneously and so uniformly heated as to avoid blade distortion.

2. The louver damper of claim 1 in which the first ends of the shafts of each blade are welded thereto close to the ends thereof and each reinforcement includes end gussets normal to said face and welded thereto and to the first shaft ends.

3. The louver damper of claim 1 in which seats extend about and into the flow path seals extend out the margins of the blade except along the margin of one blade that is proximate to a blade when the damper is closed, the seats and the last named blade margin engaged by the seals when the damper is closed, said seals connected to the blade margins in a manner preventing their distortion by thermal expansion forces.

* * * * *